United States Patent [19]

Jarvis et al.

[11] Patent Number: 5,027,341
[45] Date of Patent: Jun. 25, 1991

[54] STATION LINE SWITCHING CONTROL SYSTEM

[75] Inventors: J. Michael Jarvis, Richmond; Andrew F. Bass, Vienna, both of Va.; James B. Sherman, Chapel Hill, N.C.

[73] Assignee: Charter Leasing Corporation, Richmond, Va.

[21] Appl. No.: 501,701

[22] Filed: Mar. 30, 1990

[51] Int. Cl.$^5$ .......................... H04J 3/06; H04M 3/50; H04Q 11/04
[52] U.S. Cl. ........................................ 370/13; 370/62; 370/105.1; 370/110.1; 379/210
[58] Field of Search ................... 370/13, 66, 110.1, 62, 370/105.1; 379/230, 231, 210

[56] References Cited

U.S. PATENT DOCUMENTS 4,885,769 12/1989 Beferle .............................. 379/210
4,901,344 2/1990 Monette et al. ....................... 379/93

Primary Examiner—Thomas W. Brown
Attorney, Agent, or Firm—Lowe, Price, LeBlanc and Becker

[57] ABSTRACT

A station controller for use in a telephone system includes a plurality of digital telephone stations comprising one or more multi-station pick up groups, each having a primary station and one or more associated secondary stations for picking up calls to the primary station. The secondary stations generate a pick up signal to initiate pick up of a call to the primary station and have indicating lights or the like. A centrex exchange is connected to a station controller through a digital carrier link and the station controller is connected to the telephone stations by digital links. The station controller includes a monitor for monitoring the status of each primary station and generating a status signal, and controls the status of the indicators of the secondary stations responsive to the status signals. Also provided are a first data store for sequentially storing incoming data groups from the carrier link, a second data store for sequentially storing incoming data groups from the digital links responsive to polling of such links, a translator for transferring data from the second storage corresponding to a secondary station to the carrier link responsive to a status signal indicating a call to a primary station and responsive to a pick up signal from the secondary station to establish through the controller communication between such secondary station and the channel in the carrier link initiating the call to the primary station. A timer is provided for timing signal transfer with and within the station controller and the timer derives its framing and phasing from the carrier link.

16 Claims, 3 Drawing Sheets

STATION LINE SWITCHING CONTROL SYSTEM

TECHNICAL FIELD

The present invention relates to telecommunications networks and in particular to networks which include a centrex telephone exchange and a supplemental controller between the centrex exchange and telephone stations served by the exchange.

BACKGROUND OF THE INVENTION

Organizational or business users of telecommunications services have communications needs that may not be satisfied by the ordinary subscriber network. Typically such service is provided by a private branch exchange (PBX or PABX) system or a centrex System. Centrex service refers to a type of central office service that provides the equivalent of PBX or PABX service furnished by telephone companies through equipment located in the central office (CO). Centrex service provides direct inward dialing (DID) and direct outward dialing (DOD) and is attractive in that it requires a minimum amount of telephone equipment located at the customer premise.

In centrex telephone exchanges, the management of telephone calls to and from the telephone stations served by exchange is computer processor controlled and driven. In one form the exchange provides a multi-station pick up capability. In this type of exchange, the memory of the centrex is provided with a map which defines secondary telephone stations of the exchange which can pick up telephone calls originating at each station of the exchange. Each station thus defines with these secondary stations a so called multi-station pick up group.

Hereinafter, when referring to the stations of a multi-station pick up group, the term primary station is used to refer to the station whose call can be picked up and the term secondary station is used to refer to each station which can pick up for the primary station. Any telephone station in the exchange might be a primary station of one pick up group and a secondary station of one or more other pick up groups.

When the centrex exchange originates a call at a primary station of a pick up group, i.e., rings that station, and the primary station does not pick up, any of the secondary stations in the pick up group can then pick up the call. Pick up is initiated by a secondary station transmitting a pick up signal to the centrex exchange. This pick up signal is typically generated by preselected keying at the secondary station.

The centrex exchange receives the pick up signal and processes the signal via its pick up group map. In particular, the centrex determines from this map whether the secondary station identified by the pick up signal is in the pick up group of the called primary station. If the secondary station is in this pick up group, the centrex then transfers the call from the called station to the secondary station and the call is then picked up.

In order for the secondary telephone stations in each pick up group to be aware of the call status at the primary station of the group, each secondary station may be provided with a lamp or other indicator which identifies the primary station and whose state indicates the status of such station. Control of these lamps is through the centrex exchange. Typically the centrex exchange monitors the status of the primary station in each pick up group and transmits to the secondary stations in the group lamp control signals which control the states of the lamps of the secondary stations in accordance with the monitored status (e.g., primary station busy——secondary station lamp is controlled to be full on; primary station ringing——secondary station lamp is controlled to be flashing at specified rate; etc.).

Despite these features it has been found that in actual practice centrex users typically install some form of key or feature telephone behind the centrex in order to obtain the desired service. The reasons for this are complex but basically fall into one or more of the following categories:

1. Need for additional line appearances on one or more telephones.
2. Need for signaling or intercommunication between one or more telephones in a group (intercom).
3. Need for easy access to features of the centrex system (button access).

In order to satisfy these requirements vendors generally install electronic key systems and in some instances install electromechanical equipment of old if not obsolete design. In either event such systems were not specifically designed to work with centrex and generally encounter one or more of the following problems:

1. Their features clash with those of the centrex system, i.e., transfer of calls.
2. With electronic equipment a lack of flexibility for provision of line appearances.
3. Equipment cost along with the maintenance service associated with such equipment.

As one alternative to the centrex controlled system it has been proposed to use modular station controllers between the telephone stations and centrex exchange (David Systems Corporation). These station controllers are each assigned a number of stations and each permits digital communication with its assigned stations. Multi-station pick up is accomplished by providing both lamp and switching control for the pick up groups at the controllers. This requires comprehensive switching equipment at each controller. Also in this type of system additional per station relay equipment is utilized to enable telephone stations not assigned to a controller to be in a pick up group controlled by that controller. While this approach reduces the processing constraints on the centrex exchange and allows the use of digital telephone stations, the switching equipment needed in each controller is complex and costly.

In another alternative described in U.S. Pat. No. 4,885,769 issued 12/5/89 to John D. Beierle, modular station controllers are associated with the centrex central office and connected between the telephone stations and the centrex exchange. According to this arrangement each controller is assigned a group of telephone stations and configured and programmed to permit digital communication with its assigned stations. Lamp control for the stations within a group is accomplished by the controller for the group. Lamp control for the total stations collectively is accomplished through a local area network (LAN) linking the controllers. The switching occurs in the centrex for all communication, i.e., between stations in a group, call transfer within and across groups, all call pick up and intercom. The station controllers provide digital communication between the assigned telephone stations and the controller and provide analog communication between the controller and the centrex exchange. In the described system this involves analog-to-digital (A/D) and digital-to-analog (D/A) conversion in each station line served by each controller.

SUMMARY OF THE INVENTION

It is an object of the present invention to provide an improved and economic business communications network.

It is another object of the invention to effectuate an improved telephone system employing a centrex exchange and linked consumer premise modules or controllers to effectuate improved PBX/PABX type services with economic equipment and maintenance costs.

It is a further object of the invention to provide a modular customer premise controller for satisfying the above object.

It is yet another object of the present invention to provide an economic and improved business communications network using a carrier system and digital telephone stations linked by a modular controller which is slaved to the carrier and constructed and programmed to perform a unique set of functions.

In accordance with the principles of the present invention the foregoing and other objects are realized in a telephone system employing a centrex exchange connected by a carrier system to customer premise controllers serving digital telephone stations to provide easy access to features of the centrex system in addition to customer premise implemented multiple line appearances and intercom between the stations served. The customer premise controller is connected to the centrex office by a T Carrier Span and the carrier is distributed to the customer's premise stations by a star network from the Customer Subscriber Unit (CSU) of the carrier. Each telephone station has access to any carrier channel through a processor controlled customer premise module or controller configured to operate with any of the various types of T systems. Channel selection may be by pressing line keys on the telephone station as with conventional 1A2 systems. Illuminated status indicators associated with each line may provide the same status indications as a 1A2 system. A local area network (LAN) links individual customer premise controllers to provide a line status intercommunicating pathway between telephones in different carrier systems. Ringing and off-hook may be determined by the signaling bits embedded in the T carrier signaling format. Hold information may be derived from the LAN used for inter-exchanging signaling information and intercoms. Intercom between carrier systems is by normal centrex intercom service. Call pick up between primary and secondary stations served by one controller module is accomplished within that module.

It is another object of the invention to provide a method of operating a telephone network which includes a plurality of digital telephone stations and a centrex exchange and a station controller connected between such telephone stations and centrex exchange by a digital carrier link to the centrex exchange and by digital links to the telephone stations which includes the steps of sequentially storing incoming data groups from the digital carrier link and addresses thereof, sequentially polling the digital links to the telephone stations, sequentially storing incoming data groups from the digital links responsive to the polling, transferring selected data stored from the polling of said digital links to the digital carrier link and/or a digital link to the telephone stations, and slaving the framing and phase of the signal transfer with and within the station controller to signals from the digital carrier link.

It is another object of the invention to provide a station controller for use in the telephone system wherein the controller is connected to a centrex exchange by a digital carrier link and is connected to a plurality of digital telephone stations by digital links wherein the controller includes first storage means for sequentially storing incoming data groups from the digital carrier link and addresses thereof, second storage means for sequentially storing incoming data groups from the digital links to the telephone stations responsive to polling thereof, translator means for transferring selected data from the second storage means to the digital carrier link and/or a digital link to the telephone stations, and timing means for timing signal transfer within and within the controller, wherein the timing means derives its framing and phase from the digital carrier link.

BRIEF DESCRIPTION OF DRAWINGS

The above and other features and aspects of the present invention will become more apparent from the following detailed description in conjunction with the accompanying drawings, in which.

BEST MODE FOR CARRYING OUT THE INVENTION

Figure 1:
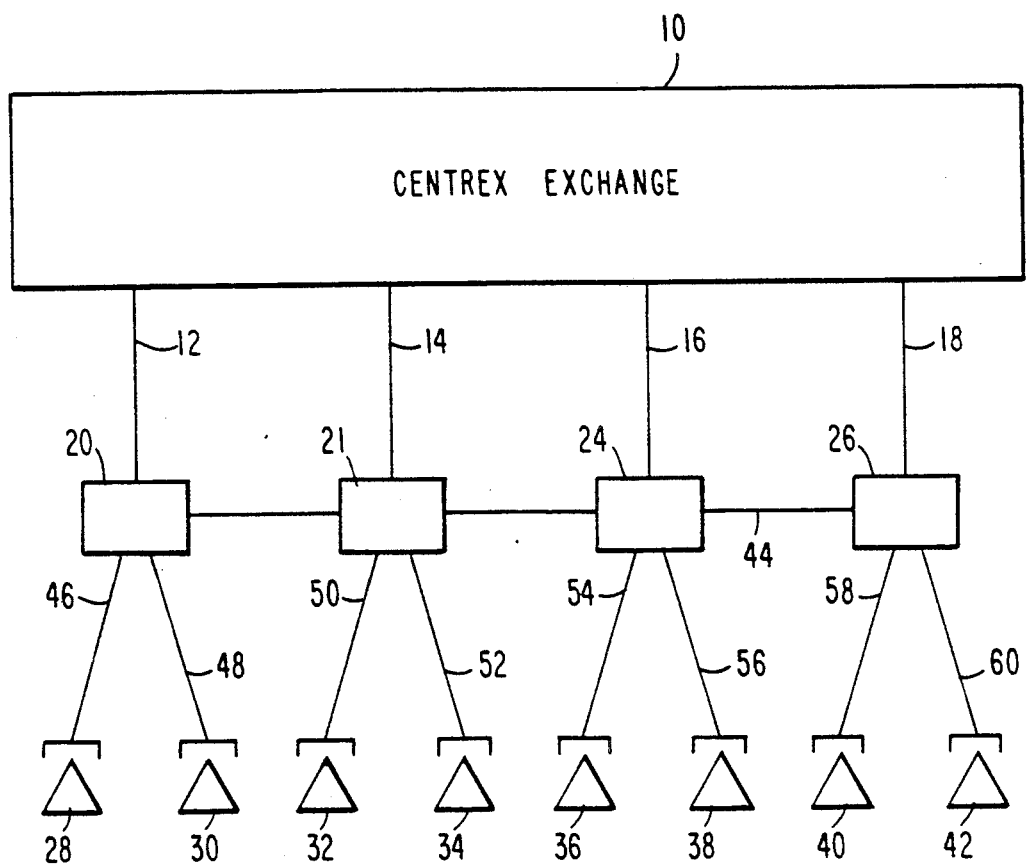
FIG. 1 shows a telephone system in accordance with the principles of the present invention.

Referring to FIG. 1 there is shown a central office (CO) 10 which provides centrex telephone service (centrex exchange). Connected to the centrex CO 10 are a series of digital carriers 12–18 such as the T1 carrier system described in Greene et al U.S. Pat. No. 4,059,731. Each frame of information of the T1 carrier system comprises 24-8 bit channels and one or two single bit channels used to convey framing and control information. Alternately the channels 12–16 may be comprised of the A, B, C and D channels in a SLC 96 which includes five T channels. As will be understood the fifth channel in a SLC 96 link is a spare channel. The spare is not utilized according to the present invention.

Connected to each T span 12–18 is a customer premise processor or controller 20–26. Each processor 20–26 in turn may serve 24 or more digital telephone stations indicated in reduced representative fashion at 28–42. The four processors or controllers 20–26 are tied together by a local area network (LAN) 44 of the ring or equivalent type for purposes to be described. The number of controllers is determined by the number of channels needed, i.e., 48 channels would require 2 controllers, 72 channels would require 3 controllers with 4 controllers comprising a full SLC 96 system (excluding the spare). The four controllers 20–26 in FIG. 1 are shown illustratively as A, B, C and D channels of a SLC 96 carrier. It will be understood that the carrier links 12–18 may be either wired or optic. The telephone stations 28–42 are connected to the controllers 20–22 via digital links 46–60 which may comprise 2 wire line circuit.

Figure 2:
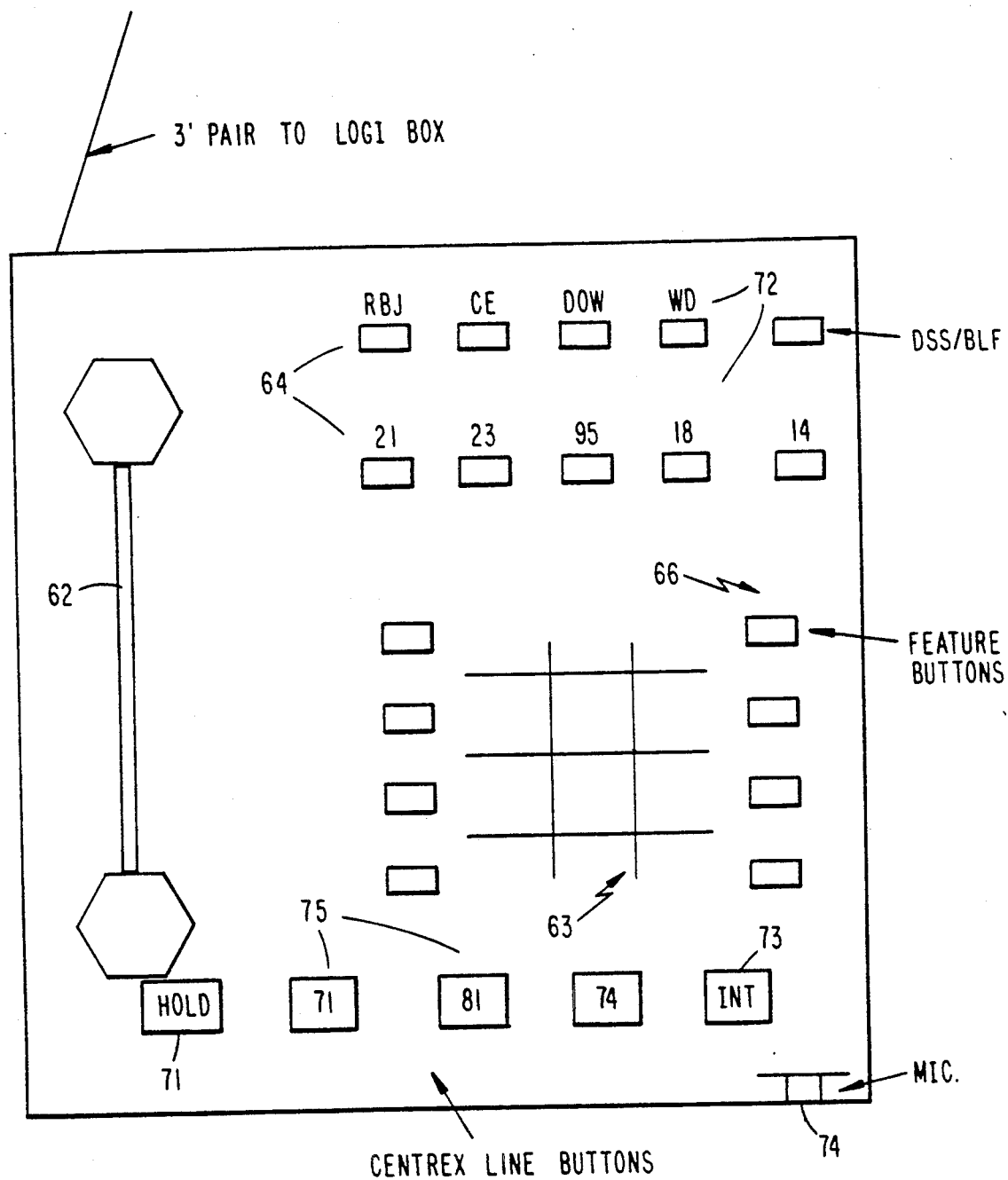
FIG. 2 illustrates a telephone station of the system of FIG. 1.

Referring to FIG. 2 there is seen a diagrammatic illustration of a digital telephone suitable for use in the present system. Such telephones are commercially available as will be understood by those skilled in the art. As shown, the telephone includes a hand set 62 and 4 sets of buttons 64–70. These buttons comprise Direct Station Selection/Busy Lamp Field (DSS/BLF) buttons 64 which may contain LED's to provide a visual indication of the status of telephones throughout the system. Such indications include busy, ringing and idle and possibly other station indications such as Do Not Disturb (DND) and the like. Legends may be provided on or adjacent the DSS/BLF buttons 64 as indicated at 72. Depressing these buttons results in automatic dialing of the station associated with the button through the centrex.

The second set of buttons 66 comprises centrex feature keys which are depressed to activate the features associated with the buttons, such as transfer, call forwarding, etc. The third set of buttons 68 comprises the self-explanatory dial pad DTMF buttons 68. The fourth set of buttons 70 actually comprises three types, i.e., a Hold button 71, an Intercom button 73 and line pick up buttons 75. Depressing the line pick up buttons 75 permits the user to access the centrex line associated with that button and its number. The buttons are provided with appropriate legends mounted thereon or adjacent thereto. The telephone instrument may also be provided with a conventional microphone/speaker 74 for hands free operation.

Figure 3:
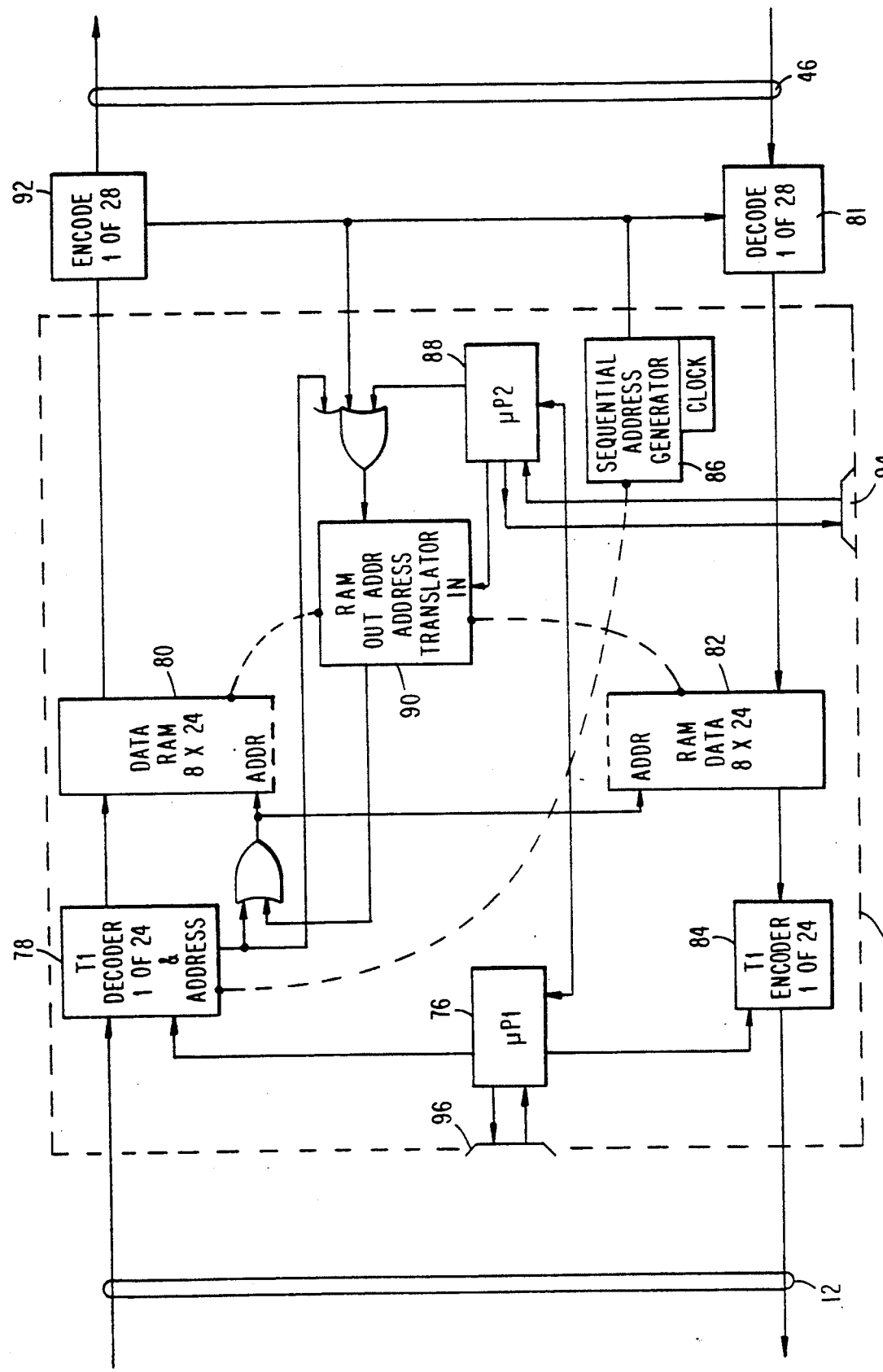
FIG. 3 illustrates the details of a station controller module of the system of FIG. 1.

Referring to FIG. 3 there are shown the details of one of the controllers 20–26, here designated illustratively as controller 20. The controller 20 is connected to the remote end of its T carrier span 12 which may constitute a T1, T1C or one channel A, B, C or D of a SLC 96 link. When the system is intended to operate with a SLC 96 one unit will function as the A system and the other units will function as the B, C or D systems. When only a single controller is used it will operate in A channel fashion through an appropriate manual switch on the module. That is a single controller 20 will handle one SLC T channel. It handles either an A, B, C or D channel and may be provided with a suitable program switch (not shown) to effect such dedication. The spare fifth channel in a SLC 96 is not utilized and the associated switching and its expense is thus eliminated.

System alarms and other required inter-system control signaling is handled by the serial communications link through port 96 to microprocessor unit 76. The serial data port 96 provides the data interface to external applications processors and is the port used to program the SLC for line appearances, BLF appearances, internal intercom groups, centrex feature activation codes, and the interface for the attendant's console.

The data from the T span 12 comes into the Channel Service Unit/Data Service Unit or CSU/DSU 78 where it is assigned a specific address and is transferred sequentially into the store data RAM 80. As will be understood, each T link carries 24 Time Division Multiplexed (TDM) eight bit word channels. These are transferred sequentially into their respective slots in the 8—24 data store RAM 80 along with the 24 consecutive addresses generated by the CSU/DSU 78.

At the same time data from an addressed telephone station is transferred from the telephone station via digital link 46 to data store RAM 82 to CSU/DSU encoder 84 to T link 12. The number of telephone stations which are served by the controller 20 may exceed the number of channels in the T link. In the instant discussion it is assumed that 28 telephone stations are connected to the controller and that the data store RAM 82 is in an 8×28 configuration with associated addresses. The data coming from the various telephone stations is stored at consecutive addresses 1–28 in the data store RAM 82. This is accomplished by sequential address generator 86 which includes a clock or timing means for generating a signal for polling the telephone stations connected to the controller 20. Each such station is connected to the controller through an encoder 92 and a decoder 81.

It is an important feature of the invention that both receiving and transmitting channel synchronization is provided in the controller 20 from information derived from the receive decoder or CSU/DSU 78 connected to the T carrier span. The clock in the Sequential Address Generator 86 is slaved to the incoming T1 signal. This provides phase lock so that both frame timing and phasing are derived from the T signal. This slaved clocking extends to timing of the ping-pong protocol to the telephone stations on the digital links 46. It will be understood of course that ping-pong protocol refers to a method of obtaining full-duplex data transmission over a 2 wire circuit by rapidly alternating the direction of transmission. The slaving of the timing and phasing of the controller to the T1 signal significantly reduces the hardware required in the controller and effects a concomitant reduction in the cost of the unit and the network which the controller makes possible. In the event of loss of incoming timing the system will operate in a limited local mode, i.e., it will provide intercom communications under timing generated by the clock in the sequential address generator 86.

The output of the T span receive decoder CSU/DSU 78 generates 24 consecutive addresses 1–24 for the data RAM 80 and address translator 90. Addresses in the data store RAMs 80 and 82 are fixed. The incoming data is sequentially stored therein for later accessing and outputting to the appropriate telephone station or carrier channel.

When the decoder CSU/DSU 78 stores the incoming data in the data store RAM 80 it also forwards that address information to the address translator 90. A similar sequence occurs when data from the telephone stations is stored in the data store RAM 82. The MPU 88 directs the address translator 90 to initiate data transfer from the telephone data store RAM 82, addresses one of 28, to forward the appropriate data from that store to either T carrier encoder CSU/DSU 84 or to encoder 92 in the case of intra-controller intercom. The MPU 88 accomplishes this by supplying the translation address or pointer to address translator 90. The address translator 90 in turn supplies the address to the telephone data store RAM 82 which directs it to route the data to either the T encoder CSU/DSU 84 or the telephone channel encoder 92.

As stated, data from the telephones is loaded into the telephone data store RAM 82 from the telephone channel decoder 81 based on the sequential address 1 of 28 derived from the scanning of the incoming telephone data in response to the signals from the sequential address generator 86. Data to the telephones via the telephone encoder 92 may be from either the incoming T data store RAM 80 or the telephone data store RAM 82 for internal traffic. The system derives the correct addressing information from address pointers stored in the address translator 90.

One of the T1 system requirements is that when no traffic is present on a channel that the channel will be filled with zeros. This is accomplished by the address translator 90 directing the telephone data store RAM 82 to an address containing all zeros.

Control information for line appearances and status information is derived from and to the telephones via the control data bits. The number of data bits transferred in a packet between the KSU and the telephone is 10. Of the 10 eight are for voice information and two are for data information. The two data bits are stored in a segregated area of the T1 data store RAM 80 and the telephone data store RAM 82 until a complete word is assembled so that the system can act on the information.

The MPU 88 uses the serial link 94 and the local area network (LAN) 44 to which it is connected to provide and update line status information between different controller units 20-26. This information is broadcast on the LAN so that other controllers can extract the information needed to update busy lamp fields (BLF) display status. Each MPU 88 reads these messages and extracts the specific data needed to change the status of its specific BLF's. This process of broadcasting on the LAN is performed in response to a request poll generated by the system operating as channel A.

The crystal frequency for the system may be 37.056 MHZ. This is used directly by the programmable gate arrays 80 and 82 which may be Xilinx arrays and is divided by two to be used by both MPU's 76 and 88. System memory firmware may be either a 27256 or 27512 EEPROM and the non-volatile constance storage may be via 28C17 EEPROM. MPU's 76 and 78 may be TI TMS 370C250S. The protocol between the telephone and the KSU will be determined by the telephone instrument.

The operation of the system may be described as follows:

Assume that a user has a telephone instrument as outlined in FIG. 2 and notices that the primary telephone line "RBJ" is flashing. Assume also that the user station is a secondary station to the RBJ telephone line and is in the same controller group as the RBJ primary station. If the user decides to intercept the call ringing on RBJ he/she first picks up the RBJ line which it is assumed is line 1 in the T span to this controller. This pick up is accomplished by depressing the RBJ button to send a command via whichever telephone station digital link 46 is connected to the user's set. This is received by the decoder 81 causing the microprocessor 88 to issue a command to address translator 90 which in turn directs the data store RAM 80 to output its data at the appropriate time slot to encoder 92 for the telephone station connected over digital link 46. The reverse path is then established through decoder 81 and data store RAM 82 to encoder CSU/DSU 84 to the proper time slot in the digital carrier link 12 for that particular T span channel. The pick up thus occurs within the controller with timing, framing and phasing slaved to the T span carrier link. The need for buffers and converters is eliminated. Because the pick up occurs within the controller there is a limitation of the load imposed upon the centrex exchange.

In the situation where the RBJ line is not in the same T carrier system the ringing status indication or flashing of the RBJ button is received by the controller 20 over the LAN and serial link 94. The user thereupon depresses the RBJ button on his/her telephone instrument which will cause the microprocessor 88 to generate a signal to be sent back over the carrier system to the centrex exchange via data store RAM 82 and encoder CSU/DSU 84. This will direct the centrex to the RBJ line to provide a dial tone from the centrex office. Upon execution of a suitable pick up signal, such as for example switch hook #71 plus the extension number of RBJ, a connection to the RBJ line is completed through the centrex.

Alternatively, the pick up command may be stored at the telephone station so that directed call pick up can occur at the centrex. As another alternative the direction for the call pick up can be generated in the controller rather than at the telephone station. The centrex exchange responds and the line now comes back to the user's telephone station over a channel of the carrier system that is connected in regular fashion using decoder CSU/DSU 78, data store RAM 80, encoder 92, decoder 81, data store RAM 82, and encoder CSU/DSU 84 to complete the connection. This switching occurs at the centrex exchange.

The contrast between the first and second above examples should be noted. In the first example, where the primary station to be picked up was in the same T span served by the same controller, the switching was performed within the controller and no indication of a transfer or rearrangement was ever sent to the centrex exchange. In the second example, where the primary station was in a different T span and controller than the secondary station, the switching was performed by the centrex exchange.

If the user depresses a centrex line button such as, for example, the button marked 74 in FIG. 2, a dial tone is received and whatever call is placed is routed through the centrex regardless of whether the called telephone station is within the T span of the particular controller or not. Thus a call between two stations connected to the same controller would go through the centrex if routed in this fashion. On the other hand, if the user depresses the Intercom button 73 and 1 or 2 digits identifying the Intercom station the call is completed through the controller 20 without going to the centrex.

In the case of an internal intercom call within the controller 20 data enters the controller via decoder 81 and proceeds to data store RAM 82. Depressing the Intercom button 73 would tell the microprocessor and translator 88 and 90 that an internal call is being established. The data store RAMs 80 and 82 are linked to the translator 90 and when in the Intercom mode the data from data store RAM 82 proceeds to the encoder 92 to be transmitted out to the appropriate telephone station through the loop thus established.

In the situation where the user desires communication with a station which is not within the same T span or controller it is necessary to utilize the centrex via a centrex button 75. There is no other intercom between different controllers. On the other hand, line pick up is possible between primary and secondary stations connected to different controllers in the manner described above where the centrex effects the switching.

The LAN and serial port 94 provides status information between controllers. One of the features of a SLC 96 is that all of the alarms and control for the system are accomplished through channel A. In a full SLC 96 arrangement such as shown in FIG. 1, the alarm and control information passing through channel A is provided to the other controllers B, C and D through the LAN and serial ports 94 in the controllers. There is no alarm or control information in the B, C and D links in a conventional SLC 96.

It will be apparent from the foregoing that the system and method of the invention provides an improved operation of a centrex network using a digital carrier link and digital telephone stations connected to a customer premise controller. The controller sequentially stores incoming data groups from the digital carrier link and sequentially polls the digital links to the telephone stations to sequentially store data groups received in response to the polling. Selected data stored from the polling of the digital links is transferred to the digital carrier and/or a digital link to the telephone stations with slaving of the framing and phase of the signal transfer with and within the controller to signals from the digital carrier link. It will be understood that while the preferred embodiment of the invention has been described in terms of the drawings that this has been by way of illustration only and is not intended to be restrictive.

We claim:

1. A station controller for use in a telephone system, the telephone system comprising:

a plurality of digital telephone stations including one or more multi-station pick up groups, each pick up group having a primary station and one or more associated secondary stations for picking up calls to the primary station, means associated with said secondary stations for generating a pick up signal to initiate pick up of a call to the primary station of the pick up group, said secondary stations having indicating means; and a centrex exchange for managing the flow of telephone calls to and from said telephone stations;

said station controller being adapted to be interposed between associated telephone stations and said centrex exchange and connected to said centrex exchange by at least one digital carrier link and connected to said associated telephone stations by digital links;

the station controller including:

means for monitoring the status of each primary station included in the associated stations and generating a status signal;

means for controlling the status of said indicating means of said secondary stations responsive to said status signals;

first storage means for sequentially storing incoming data groups from said digital carrier link;

second storage means for sequentially storing incoming data groups from said digital links responsive to polling thereof;

means for polling said digital links;

translator means for transferring data from said second storage means corresponding to one of said secondary stations to said digital carrier link responsive to a status signal indicating a call to a primary station in said associated stations and responsive to a pick up signal from said secondary station to establish through said controller communication between said secondary station and the channel in said digital carrier link initiating said call to said primary station; and timing means for timing signal transfer with and within said station controller, said timing means deriving its framing and phasing from said digital carrier link.

2. A station controller according to claim 1 wherein said translator means is adapted to transfer data from said second storage means corresponding to a first telephone station connected to said station controller to a second telephone station connected to said controller responsive to a status signal indicating an intercom call to establish through said controller communication between said first and second stations.

3. A station controller according to claim 1 wherein said timing means is slaved to the timing of signals on said digital carrier link.

4. A station controller according to claim 3 wherein said digital links from said controller to said telephone stations comprise two wire line circuits using ping-pong transmission slaved to said digital carrier link.

5. A station controller according to claim 4 wherein said digital carrier link comprises a T link.

6. A station controller according to claim 1 wherein said timing means includes clock means adapted to continue to provide timing for signal transfer with and within said station controller in an intercom mode to provide communications between a pair of stations connected to said controller in the absence of framing and phasing derivation from said digital carrier link.

7. A station controller for use in a telephone system, the telephone system comprising:

a plurality of digital telephone stations and a centrex exchange for managing the flow of telephone calls to and from said telephone stations;

said station controller being adapted to be interposed between said telephone stations and said centrex exchange and connected to said centrex exchange by at least one digital carrier link and connected to said telephone stations by digital links;

the station controller including:

first storage means for sequentially storing incoming data groups from said digital carrier link;

second storage means for sequentially storing incoming data groups form said digital links to said telephone stations responsive to polling thereof;

translator means for transferring selected data from said second storage means to said digital carrier link or a digital link to said telephone stations; and timing means for timing signal transfer with and within said station controller, said timing means deriving its framing and phasing from said digital carrier link.

8. A station controller according to claim 7 wherein said translator means is adapted to transfer data from said second storage means corresponding to a first telephone station connected to said station controller to another telephone station connected to said controller responsive to a status signal indicating an intercom call to establish through said controller communication between stations.

9. A station controller according to claim 7 wherein said digital links from said controller to said telephone stations comprise two wire line circuits using ping-pong transmission slaved to said digital carrier link.

10. A station controller according to claim 9 wherein said digital carrier link comprises a T link.

11. A method of operating a telephone network including a plurality of digital telephone stations and a centrex exchange for managing the flow of telephone calls to and from said telephone stations, and a station controller connected between said telephone-stations and said centrex exchange by at least one digital carrier link to said centrex exchange and connected to said telephone stations by digital links; the steps comprising:

sequentially storing incoming data groups from said one digital carrier link;

sequentially polling said digital links to said telephone stations;

sequentially storing incoming data groups from said digital links responsive to said polling;

transferring selected data stored from the polling of said digital links to said digital carrier link or to a digital link to said telephone stations; and slaving the framing and phase of the signal transfer with and within said station controller to signals from said one digital carrier link.

12. A method according to claim 11 including establishing two-way communication between multiple telephone stations connected to said controller by said digital links through said controller wherein the framing and phasing of the transfer of data groups constituting said communication is derived from said one digital carrier link.

13. A method according to claim 12 including the step of controlling the framing and phase of the transfer of said data groups constituting said two way communication from a timing means in said station controller during periods of absence of signal from said digital carrier link.

14. A method of operating a telephone network which includes:

a plurality of digital telephone stations including one or more multi-station pick up groups, each pick up group having a primary station and one or more associated secondary stations for picking up calls to the primary station, said secondary stations having indicating means, and a centrex exchange for managing the flow of telephone calls to and from said telephone stations;

a station controller being interposed between associated telephone stations and said centrex exchange and connected to said centrex exchange by at least one digital carrier link and connected to said associated telephone stations by digital links;

the steps comprising:

monitoring the status of each primary station included in the associated stations and generating a status signal to indicate the status of said primary station;

indicating at one or more secondary stations the status of at least one primary station responsive to said status signal;

storing in a first data store incoming data groups from said digital carrier link;

polling said digital links;

sequentially storing incoming data from said digital links responsive to said polling;

transferring data in said second data store corresponding to a secondary station to said digital carrier link responsive to a status signal indicating a call to a primary station included in said associated stations to establish through said station controller communication between said secondary station and the channel in said digital carrier link initiating said call to said primary station; and controlling the frequency and phase of the signal transfer of data groups with and within said station controller responsive to the timing of a signal derived from said digital carrier link.

15. A method according to claim 14 including establishing two-way communication between multiple telephone stations connected to said station controller by said digital links through said station controller wherein the framing and phasing of the transfer of data groups constituting said communications is derived from said digital carrier link.

16. A method according to claim 15 including the step of controlling the framing and phase of the transfer of said data groups constituting said two-way communication from a timing means in said station controller during periods of absence of signal from said digital carrier link.

* * * * *